United States Patent

Derossi

[15] 3,690,752
[45] Sept. 12, 1972

[54] DEVICE FOR STANDING PROJECTION OF SINGLE PHOTOGRAMS IN A CINEMATOGRAPHIC PROJECTOR

[72] Inventor: Piero Derossi, Corso Giovanni Lanza 55, Turin, Italy

[22] Filed: Sept. 29, 1970

[21] Appl. No.: 76,546

[30] Foreign Application Priority Data

Oct. 20, 1969 Italy............. 53749-A/69

[52] U.S. Cl. ..................352/174, 352/137, 352/169
[51] Int. Cl. ............................................G03b 21/38
[58] Field of Search......352/137, 169, 174, 176, 177, 352/178, 180

[56] References Cited

UNITED STATES PATENTS

| | | | |
|---|---|---|---|
| 3,432,228 | 3/1969 | Hellmund | 352/178 X |
| 3,532,295 | 10/1970 | Watson | 352/180 X |
| 3,446,129 | 5/1969 | Burgarella | 95/10 CT |
| 3,246,817 | 4/1966 | Floden | 352/169 X |
| 3,520,596 | 7/1970 | O'Donnell | 352/137 X |
| 3,397,937 | 8/1968 | Schrader | 352/169 |
| 2,487,476 | 11/1949 | Pratt | 352/180 X |

Primary Examiner—Samuel S. Matthews
Assistant Examiner—Monroe H. Hayes
Attorney—Young and Thompson

[57] ABSTRACT

In a cinematographic projector having an electronic circuit for speed control, a device is provided for interrupting motor supply when standing projection is required. The device comprises an apertured disc rotating with the sector diaphragm of the projector and interposed between a lamp and a photoresistance connected with the electronic speed control circuit for stopping conduction of the circuit when the photoresistance is illuminated. The aperture of the disc is arranged for allowing illumination of the photoresistance when the sector diaphragm leaves a projected photogram entirely free.

6 Claims, 3 Drawing Figures

INVENTOR.
PIERO DEROSSI

INVENTOR
PIERO DEROSSI
BY Young & Thompson
ATTORNEYS 3,690,752

DEVICE FOR STANDING PROJECTION OF SINGLE PHOTOGRAMS IN A CINEMATOGRAPHIC PROJECTOR

BACKGROUND OF THE INVENTION

This invention refers to a device which may be applied to cinematographic projectors for obtaining the standing projection of a single photogram, or even of a number of successive single photograms.

In most instances it is required that a cinematographic projector be capable of stopping the projection onto a single photogram which, therefore, will be standing projected. To this purpose the driving motor of the projector should be stopped, which involves no difficulty, and moreover it is necessary to obtain that the stop position be correspondent to such a position of the sector diaphragm, wherein the same does not occult any portion of the projected photogram. This is now attained through mechanical devices which are somewhat complicated and expensive, or even one renounces to the automatic obtention of a correct stop position and lets the person which operates the projector displace by hand the sector diaphragm after the motor has stopped, until correct projection is obtained.

BRIEF SUMMARY OF THE INVENTION

The object of this invention is that of providing a device capable of stopping the motor of a cinematographic projector exactly in a position wherein the projection is correct. It is further object of the invention that of allowing, by simple operation of a push-button, to pass from the standing projection of a photogram to the standing projection of the successive photogram, and possibly so on through a series of successive photograms.

These objects are attained, according to the invention, by providing, in co-operation with an electronic device controlling the projector speed, a circuit for fast stop, whose timely operation is controlled by an opaque disk having a transparent slit or window, coupled to the shaft carrying the sector diaphragm or to another shaft rotating therewith; said disk is interposed in the path of light rays coming from a light source and directed onto a photoresistance controlling the stop circuit. Such a fast stop circuit may, if necessary, act upon the projector motor as an electric brake.

Such a stop circuit may allow to pass from a projected photogram to the successive photogram by simply making inoperative for a short time the stop circuit itself.

BRIEF DESCRIPTION OF THE DRAWINGS

The features of this invention will appear more clearly from the following description, with reference to a non limitative example of embodiment of the invention, diagrammatically shown in the annexed drawings, wherein.

DETAILED DESCRIPTION

Figure 1:
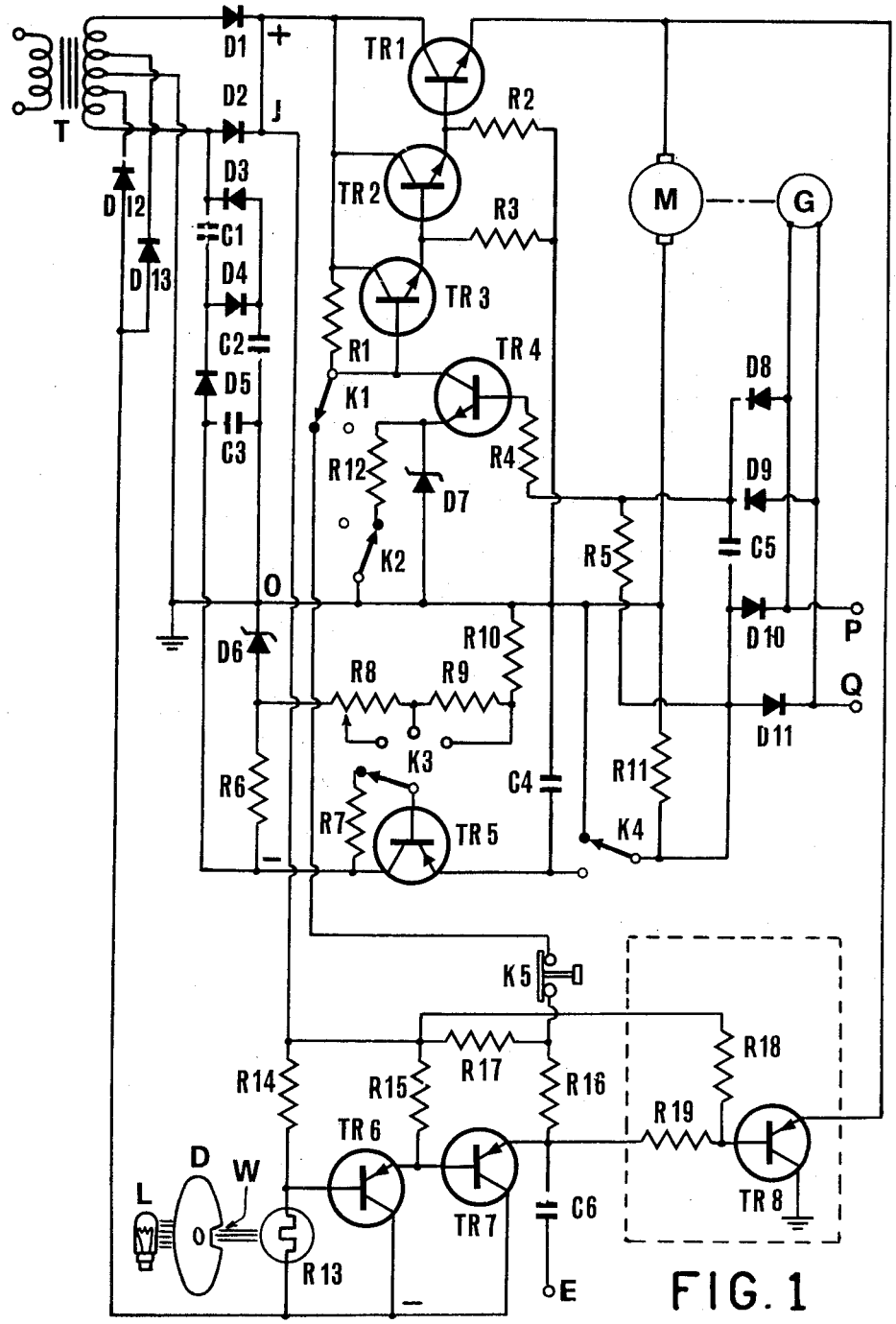
FIG. 1 shows the circuit diagram of the stop circuit being the object of this invention, as accompanied by an electronic speed control circuit particularly fit for co-operation with this stop circuit.
Figure 2:
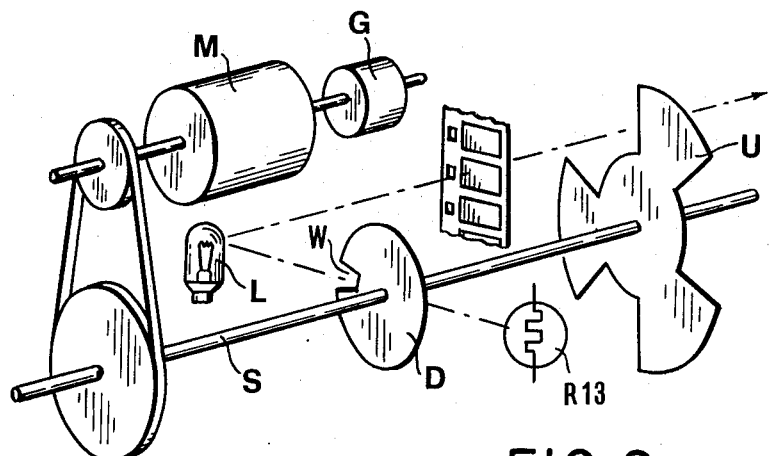
FIG. 2 shows the mechanical diagram of some portions of the device.
Figure 3:
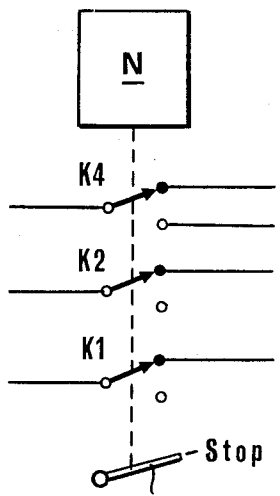
FIG. 3 shows the connections of the operative switches to the stop control means.

The circuit for speed control, which is shown in the upper portion of FIG. 1 of the drawing, and which is per se the object of another Patent Application of the same Applicant, comprises supply means T, D1 to D5, C1 to C3 feeding a supply line J; an electronic circuit for control of the motor supply, TR1 to TR4, R1 to R4, D7; a tachymetric generator G, D8 to D11 coupled to the projector motor M; a voltage divider D6, R6 to R11, TR5 for producing a stabilized reference voltage; a selector switch K3 for selecting different values of the reference voltage and, as a consequence, of the motor speeds; and resistances R5, R11 for opposing the voltage produced by the tachymetric generator G to the selected reference voltage and for applying a signal being the difference between said two voltages to the electronic circuit TR1 to TR4, whereby the supply of motor M is controlled such as to stabilize its speed within eng limits about a desired value, chosen through the selector switch K3.

It should be realized that the shown circuit for speed control is an example only and that the stop circuit of the invention may be used with other speed control circuits.

For co-operating with the stop circuit, such a speed control circuit is provided with switches K1, K2, K4 controlled all together by a stop control means H, which during normal projection are in the position opposed to that shown, and which are brought in the shown position when standing projection of a single photogram is required. In the shown position, switch K4 cuts out the reference voltage, thus arranging the speed control circuit for a very low speed of rotation of motor M; switch K2 accordingly varies the polarization of transistor TR4 connected to the input of the speed control circuit; and switch K1 connects the speed control circuit to the stop circuit, which is shown in the bottom portion of FIG. 1 of the drawing.

The stop circuit is fed by the supply line of the speed control circuit as well as by taps of the secondary winding of transformer T, through rectifier diodes D12, D13.

The stop circuit comprises a photoresistance R13 arranged for being struck and made conductive by the light rays of a lamp L, which may be the projection lamp itself or another independent one. In the path of the light rays directed from the lamp L onto the photoresistance R13 is interposed a disk D having an apertured or transparent slit or window W which allows the light rays to pass only when the said disk is in a well identified position. The disk D is keyed on the shaft S carrying the sector diaphragm U and driving the intermittent transport of the film, or on another shaft rotating therewith, and it is so timed that its slit W allows the lamp L to illuminate the photoresistance R13 only in those moments when the sector diaphragm U of the projector does not occult any portion of the projected photogram.

The photoresistance R13 is inserted in the base circuit of a transistor TR6 which normally does not conduct, due to the high resistance of R13, but which will conduct when the said photoresistance is illuminated.

The emitter circuit of TR7 comprises a first resistance R16 of a relatively low value and a second resistance R17 of a high value, which is connected to the positive supply two resistances R16, R17 is connected (when the circuit is disposed for standing projection) through switch K1 to the base of transistor TR3 of the speed control circuit.

Therefore, when the circuit, through operation of the switches K1 to K4, is disposed for standing projection of a single photogram, the motor M is fed for a very slow speed and then, when the slit W of disk D allows illumination of the photoresistance R13, this latter conducts, thus making conductive the transistors TR6, TR7, and the voltage of the intermediate point between the resistance R16, R17 becomes negative; said negative voltage reaches through switch K1 the base of transistor TR3. The transistors TR3 as well as TR2 and TR1 become non conductive and they cut off the supply to motor M which, being already slowed, immediately stops.

If casually this had not timely occurred, then the disk D would occult again the photoresistance R13 thus allowing the motor M to rotate by another revolution, at the end whereof the above explained operation repeats itself thus stopping this time the motor.

In the connection line between resistances R16, R17 and the base of transistor TR3, a normally closed push-button switch K5 is inserted. When this switch K5 is opened during standing projection of a single photogram, the operation of the stop circuit is temporarily interrupted and motor M is allowed to turn slowly. If the push-button K5 is immediately abandoned, after a single revolution the motor M will stop in correspondence of the successive photogram. If on the contrary the push-button K5 is kept permanently pressed, all the successive photograms will be projected in a slow succession, thus allowing if desired to stop onto a successive selected photogram.

In a cinematographic projector, usually the ratio between inertia and resistance to motion is low, and there is no need for braking the motor in order to obtain its timely stop. When, however, it appears suitable to brake the motor, a power transistor TR8 is connected in parallel with the motor M and is connected to and controlled by the transistor TR7. When transistor TR7 conducts, thus cutting off supply to motor M as already stated, the transistor TR8 conducts too, and it forms then a short circuit connection for the windings of motor M, thus electrically braking the motor.

From the emitter of transistor TR7 a signal may be taken at a tap E, and this signal is suitable for being used in measuring speed, in counting and projected photograms and for other possible purposes.

When standing projection is effected, the selector switch K3, which allows selection of the projection speed, may be temporarily displaced in a position wherein, as shown, it connects through a resistance R7 the base and collector of transistor TR5, thus avoiding unnecessary conduction thereof.

Of course, the stop control means H, which controls the switches K1 to K4 as stated, is connected on the other hand to the usual means N for protection of the standing photogram, such as screens, antithermic filters, means for reducing the luminous intensity of the projection lamp and the like, these means being known per se.

The device according to the invention allows, with simple purely electronic means, and without resorting to switches subjected to heavy currents, to obtain the standing projection of a single photogram, with automatic stop in the correct projection position. Moreover it allows to pass upon control from the standing projection of a photogram to the standing projection of the successive photogram, or even to the projection of successive photograms in a slow succession for selecting another photogram whose standing projection is required.

Having thus described my invention, what I claim is:

1. In a cinematographic projector comprising a motor, a shaft coupled to and driven by said motor, a sector diaphragm coupled to said shaft and cutting off the projection during transport of a film, a current supply line, a tachometric speed regulating circuit connected between said motor and said supply line, said speed regulating circuit comprising a tachometer generator coupled to said motor and supplying a tachometric voltage that varies with the motor speed, a source of reference voltage, means connected to said source for changing said reference voltage, means for comparing said reference and tachometric voltages and means for controlling the motor speed according to the difference between said reference and tachometric voltages; the improvement comprising means for providing the still projection of any desired frame of the film and comprising stop control means connected to said means for changing the reference voltage, said stop control means acting on said source to lower substantially said reference voltage, switch-off means for cutting off the current supply to the motor connected to and operated by said stop control means, a photoresistance connected to said switch-off means allowing operation of said switch-off means only when said photoresistance is in a lighted condition, a lamp illuminating said photoresistance, and between said lamp and said photo-resistance a disk having an apertured slit, said disk being coupled to said shaft and being so timed with reference to said sector diaphragm that said slit opens the light path between said lamp and said photoresistance when said sector diaphragm leaves the projected frame entirely uncovered, whereby upon operation of said stop control means said motor is firstly slowed down to a reduced speed under control of said speed regulating circuit, and then the motor is stopped in a position corresponding to a correct projection position of said sector diaphragm.

2. A projector as claimed in claim 1, and an electrical connection line between said tachometric speed regulating circuit and said switch-off means, and in said connection line a normally closed push-button switch for temporarily interrupting operation of said switch-off means thereby to allow transport of film to at least one following frame.

3. A projector as claimed in claim 1, and a power transistor connected in parallel to said motor, and an electrical connection line between said power transistor and said switch-off means, whereby said power transistor becomes conductive when said switch-off means is in operation, thereby electrically braking the motor.

4. A projector as claimed in claim 1, said switch-off means comprising first and second transistors connected in a series, the base of the first transistor being connected to said photoresistance, first and second resistances series connected between said supply line and the emitter of said second transistor, and an electrical connection line branched at one end to a point between said first and second resistances and connected at the opposite end to said tachometric speed regulating circuit, whereby said first and second transistors conduct only when said photoresistance is lighted, and then said connection line becomes negative thus cutting off said speed regulating circuit and stopping the motor.

5. A projector as claimed in claim 1, and switch means connected to said speed regulating circuit and connected to and operated by said stop control means, for reducing conduction in the speed regulating circuit during still projection.

6. A projector as claimed in claim 1, said disk and said sector diaphragm being both keyed on said shaft, and said lamp being the projection lamp of the projector.

* * * * *